US006633718B1

(12) United States Patent
Thom (10) Patent No.: US 6,633,718 B1
(45) Date of Patent: Oct. 14, 2003

(54) OPTICAL FIBER CABLE EXIT TROUGH SYSTEM

(75) Inventor: Terry T. Thom, Spokane, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 09/873,007

(22) Filed: Jun. 1, 2001

(51) Int. Cl.[7] .................................................. G02B 6/00
(52) U.S. Cl. ........................................................ 385/136
(58) Field of Search ................................ 385/134, 135, 385/136, 137

(56) References Cited

U.S. PATENT DOCUMENTS 5,142,606 A * 8/1992 Carney et al. ............. 385/134
5,937,131 A 8/1999 Haataja et al.
6,192,181 B1 2/2001 Haataja et al.

* cited by examiner

*Primary Examiner*—Khiem Nguyen
(74) *Attorney, Agent, or Firm*—Wells St. John P.S.

(57) ABSTRACT

A fiber optic cable exit trough system apparatus and method for routing fiber optic cables from a trough or raceway is provided, the exit trough system including a support or mount bracket and an exit trough which provides for the transverse routing of fiber optic cables from an existing trough or raceway. A method of assembling a fiber optic cable routing system which may include providing a longitudinal trough section, mounting a fiber optic cable exit trough to a bottom section of the longitudinal trough section or to a separate facilities support bracket, and then routing a cable from the longitudinal trough section upwardly and transversely through the exit trough.

28 Claims, 6 Drawing Sheets

OPTICAL FIBER CABLE EXIT TROUGH SYSTEM

TECHNICAL FIELD

This invention pertains to a system for the management and routing of optical fiber cables, more particularly to a system which provides a transverse exit trough for routing fiber optic cables from a longitudinal trough.

BACKGROUND OF THE INVENTION

In the telecommunications industry, there are numerous locations where a significant amount of fiber optic cable must be routed within a facility or from one facility to another. The routing within a facility may be from one piece of equipment to another, or from outside lines coming into a central office and to fiber optic connectors where they are connected to equipment within the facility.

There are typically a large number of fibers and all the fibers must be handled with care to avoid damage to the fiber optic cable, which would hinder its performance.

In a typical facility, fiber optic troughs are normally used to carry or route the fiber optic cables. In many facilities, the troughs or raceways are located overhead and over the locations of the fiber optic distribution frames, bays and equipment.

A significant trough network or raceway configuration may be needed to contain and route the fiber optic cables. The installation time and expense can be substantial for trough systems and is further increased in situations in which the troughs are not readily adaptable to the configuration desired in the facility, or when the troughs, couplings, junctions, downfalls and other equipment do not readily install or easily assemble.

There are also situations in which new equipment is later added below an existing trough and it is desirable to route cable from the trough down to the existing equipment where a downfall is not located.

The design, layout and assembly of these trough systems are further complicated because of the unique nature of fiber optic cables and how the fiber optic cable must be placed, routed and managed. In the management of fiber optic cables, it is important to maintain a minimum bend radius to protect the fiber optic cables. Examples of two current typical minimum bend radii are 1½ inches, and the other 30 mm.

In a span of a fiber optic trough it is useful to route fiber optic cable out of the trough to different equipment or locations, and to the extent this can be accomplished without providing an intersection junction or cutting an aperture to receive a transition trough (such as a downspout or downward elbow or trumpet) time and money are conserved.

It is further undesirable for an exit trough to excessively distort, bend or otherwise manipulate the longitudinal trough to which it is attached. There are prior art exit troughs, for instance, that attach to the top edge of a trough, and when loaded with fiber optical cable, twist, bend and otherwise distort the trough or raceway.

Embodiments of this invention provide an improved fiber optic cable routing system for the routing of fiber optic cable out of a span or length of longitudinal trough section, and more particularly an exit trough or offramp for routing fiber optic cable out of such a trough.

It is therefore an object of this invention to provide an improved fiber optic cable exit trough or offramp system.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Figure 1:
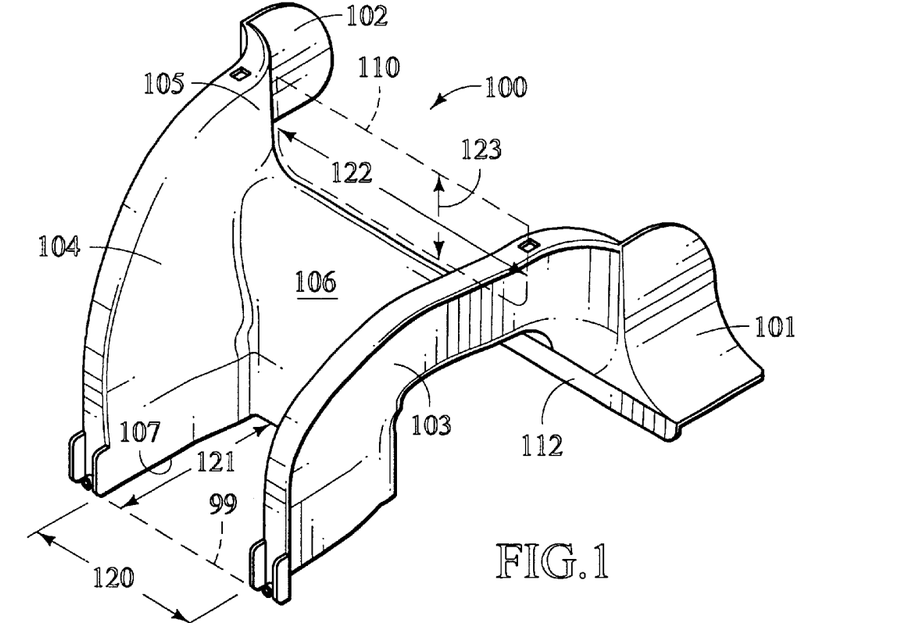
FIG. 1 is a perspective view of one embodiment of the invention.

FIG. 1 is a perspective view of one embodiment of an exit trough 100 contemplated by this invention, illustrating an exit trough 100 with a down-spout or down trough portion. This invention contemplates and includes exit troughs both with and without the down-spout or down trough (vertical) section, as an exit trough may route fiber optic cables horizontally from the entrance of the trough as well.

FIG. 1 illustrates first side wall 103, second side wall 104, base surface 106 and a bottom portion 107 of the exit trough 100. Leading into the trough are smooth or curved surfaces such as entry surface 105 which provides minimum bend radius protection for fiber optic cables routed adjacent the entry surface 105.

The embodiment of the exit trough 100 shown includes fiber optic cable bend radius protection for fibers entering the exit trough from a longitudinal trough in which it would be mounted, including first downwardly facing guide 101 and second guide 102 against which fiber optic cable may be placed. Bend radius is thereby provided for the fiber entering the exit trough.

Entrance area 110 has an entrance area height 123 and entrance area width 122, and is generally the area above or nearly above the side wall of the longitudinal trough with respect to which the exit trough is mounted. Embodiments of this invention include a lower profile or lesser height entrance area 110 for the exit trough 100.

Embodiments of this invention may have an entrance area 110 which, for example, has a height 123 of two inches and a width 122 of eight-inches. The same exit trough 100 may then transition to an exit area 99 which has a width of four-inches and a depth (in an embodiment which includes a downspout or down trough) of four-inches at the bottom end 107 of the exit trough 100.

Providing a transition in the cross-sectional dimensions of the exit trough 100 allows the same volume of fiber optic cables to be routed through approximately the same cross-sectional area through the exit trough 100, from the entrance area to the exit area. It has the benefit of providing a lower profile, or more clearance above, the exit trough 100.

Figure 2:
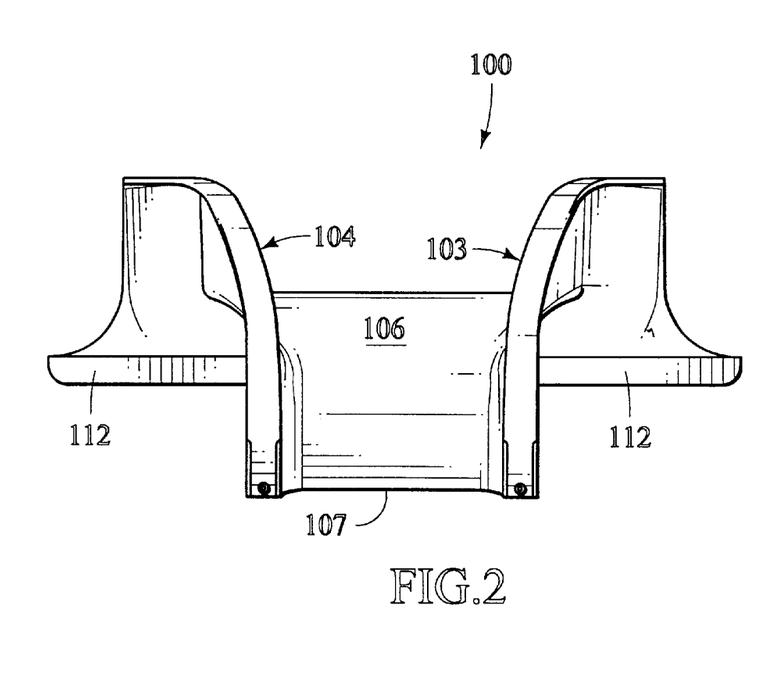
FIG. 2 is a front elevation view of the embodiment of the invention illustrated in FIG. 1.

FIG. 2 is an elevation view of the embodiment of the exit trough 100 illustrated in FIG. 1, and shows first side wall 103, second side wall 104, bottom surface 106, and bottom end 107 of the exit trough 100. Further shown in FIGS. 1 and 2 is fiber guard 112 which, as more fully illustrated in FIG. 6 and FIG. 7, acts as a guide or guard to prevent fiber from getting caught between a side wall of the longitudinal trough and the exit trough.

Figure 3:
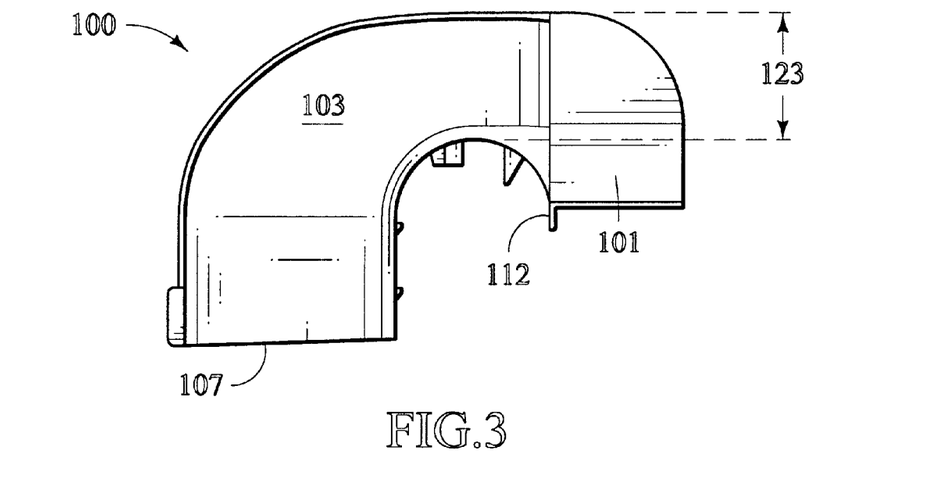
FIG. 3 is a side view of the embodiment of the invention illustrated in FIG. 1.

FIG. 3 is a side view of the embodiment of the exit trough 100 illustrated in FIG. 1, and shows first side wall 103, first guide 101, guide rail 112 and bottom end 107 of exit trough 100. FIG. 3 also shows a profile height 123 which would correspond to the entrance trough area 110 as shown in FIG. 1.

Figure 4:
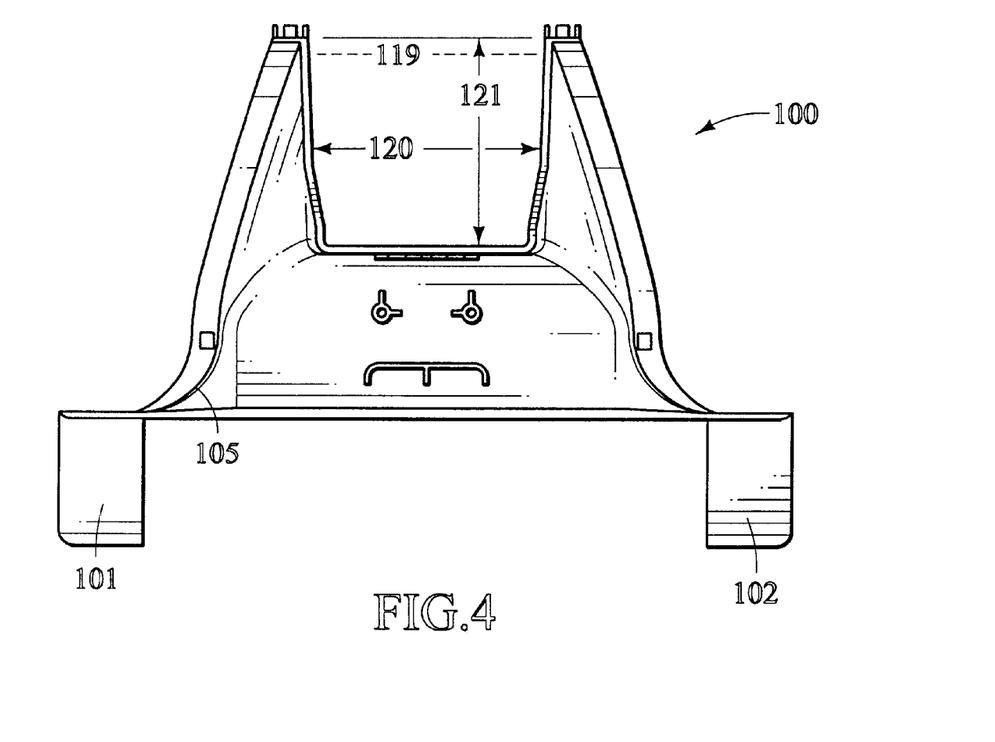
FIG. 4 is a top view of the embodiment of the invention illustrated in FIG. 1.

FIG. 4 is a top view of the embodiment of the exit trough 100 shown in FIG. 1, and illustrates first guide 101, second guide 102, exit width 120 and exit depth 121 of the bottom end of the exit trough 100. FIG. 4 illustrates the different dimensions of the bottom end 107 of the exit trough 100 as compared to the entrance area 110 as more fully shown in FIG. 1. The transition from the low profile dimensions at the trough entrance, to more traditional dimensions at the bottom end 107, allows more clearance and other advantages when installing or placing the exit trough system in a particular facility, while still accommodating the same volume of fiber optic cables through the exit trough 100.

Figure 5:
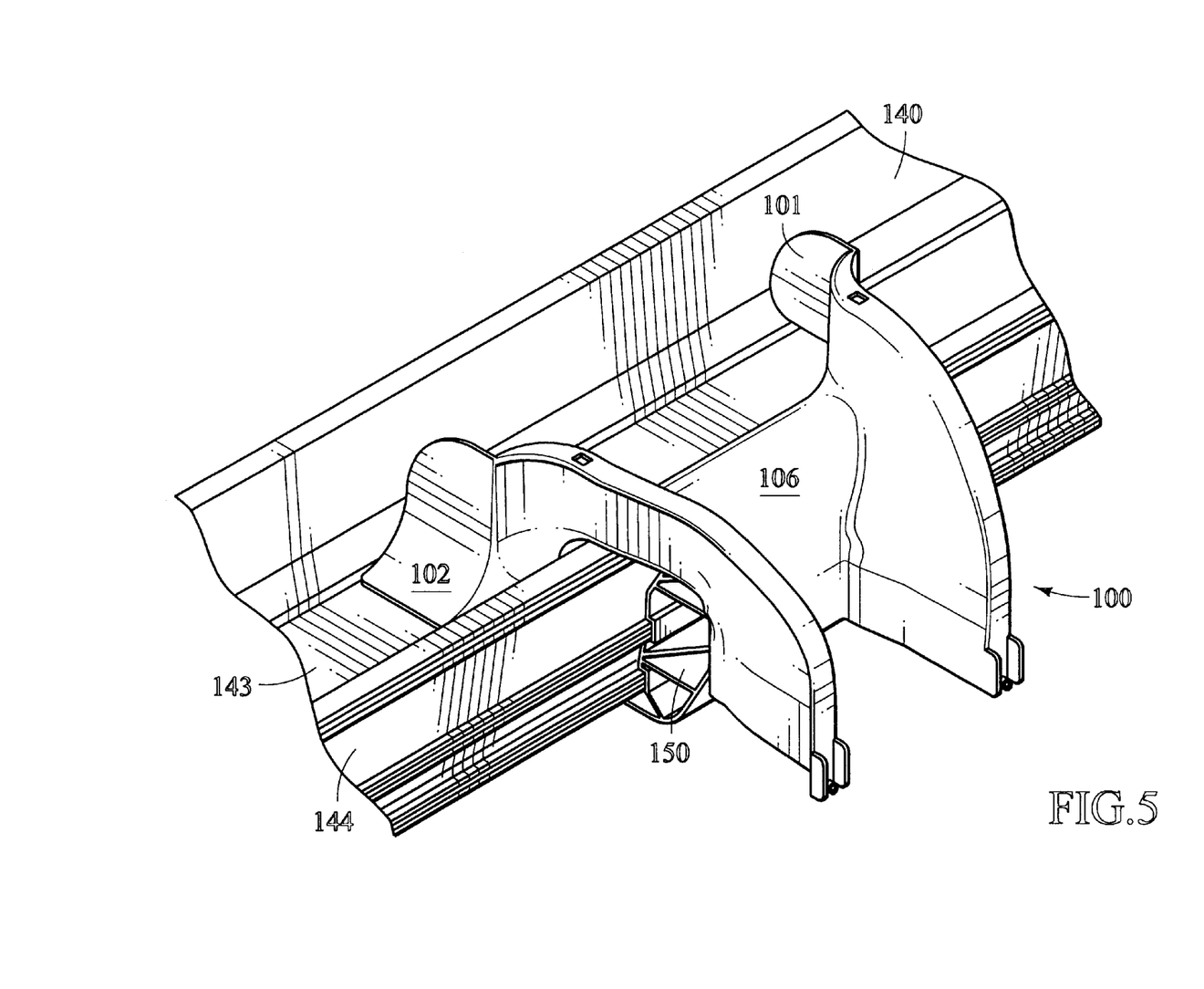
FIG. 5 is a perspective view of the embodiment of the invention shown in FIG. 1 attached to a fiber optic cable trough.

FIG. 5 is a perspective view of the embodiment of the exit trough 100 illustrated in FIG. 1, as mounted to the bottom portion of longitudinal trough 143, or relative to the bottom portion. Longitudinal trough 143 may be a typical trough or raceway found in telecommunications or other facilities, and would generally include a first side wall 140 and second side wall 144.

FIG. 5 illustrates the positioning of exit trough 100 with respect to longitudinal trough 143 via mount bracket 150. FIG. 5 also illustrates first guide 101 and second guide 102, which provide upward bend radius protection and guidance for fiber optic cables routed from longitudinal trough 143, over bottom surface 106 and through exit trough 100.

It should be noted that in FIG. 5 mount bracket 150 is attached to the bottom portion of longitudinal trough 143. As shown more fully in later figures, however, embodiments of this invention are not limited to mounting to the lower or bottom portion of longitudinal trough side wall 144, but instead mount bracket 150 may also be secured and mounted to other components such as trough mount brackets, the middle or upper portion of a side wall, or the bottom of a trough.

For example in another embodiment of the invention, mount bracket 150 is mounted to a typical support structure which is normally utilized for supporting longitudinal trough 143 (such as a vertical all-thread or a horizontal bar type support). In that way, mount bracket 150 is not mounted to longitudinal trough 143, but instead is mounted to another structure, while still be mounted with respect to the longitudinal trough 143. Mounting to a support bracket will also reduce or eliminate twisting, bending and distortion of the side wall 144 of longitudinal trough 143, as compared to mounting to a top edge.

Figure 6:
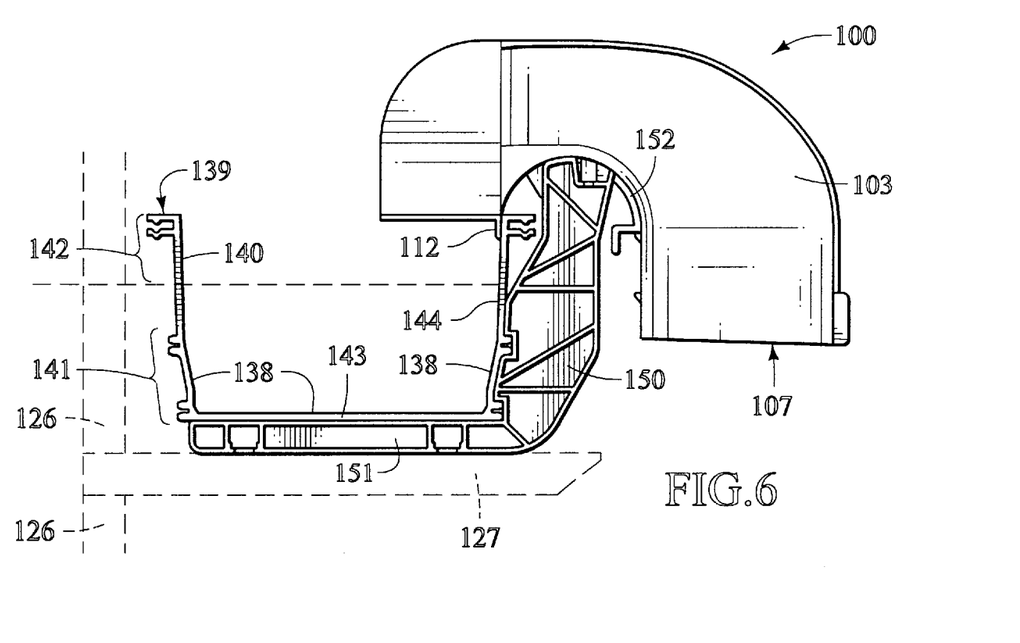
FIG. 6 is a side view of the embodiment of the exit trough mounted on the fiber optic cable trough via an embodiment of an exit trough support system contemplated by this invention.

FIG. 6 is a side view of an embodiment of this invention illustrating mount bracket 150, exit trough 100 and longitudinal trough 143. FIG. 6 shows how mount bracket 150 may be attached to, supported by or mounted on bracket 127, which in turn is mounted to support structure 126. It will be appreciated by those of ordinary skill in the art that mount bracket 150 may be either mounted to longitudinal trough 143 (as shown more fully in FIG. 7) or also may be mounted on or supported by trough bracket 127.

In many telecommunications facilities, vertical all-thread supports 126 are available or may be installed to provide the supporting structure to which brackets 127 may be mounted. In the embodiment of the invention shown in FIG. 6, bracket bottom 151 may also be configured for mounting to support bracket 127, which is separate from the longitudinal trough 143. The bracket bottom 151 may be mounted below, or above or on, the support bracket 127 by any one of a number of means, such as by screws or other fasteners. The mounting may also be by the configuration of the bracket bottom such that it is configured in a complimentary way to the support bracket 127 such that separate fasteners are not necessary, but the configuration alone (such as detents) mounts or retains the bracket bottom 151 to the separate or facilities support bracket 127. In such cases the weight of the longitudinal trough may also be utilized in combination with the configuration of the bracket bottom 151 to accomplish the mounting or securement. These can be installed for particular new installations or may be pre-existing in the facility with respect to the existing raceway system.

Embodiments of this invention further contemplate that part or all of the mount bracket 150 attach directly to a facility support 126.

This invention contemplates and includes embodiments which are horizontal exit trough configurations and down trough configurations. FIG. 6 illustrates a down trough embodiment of this invention which means there is a vertical drop from the entry of the trough to the exit of the trough. In down trough configurations there is the opportunity for the utilization of an embodiment of this invention in which there is a transition of the cross sectional dimensions of the trough. This allows more flexibility to tailor a trough solution to the specific facility. For instance, if there is low clearance above the longitudinal trough, a low profile or lower height trough entrance area may be utilized, and the trough cross section dimensions may then transition to different dimensions at the exit area.

FIG. 6 further illustrates first side wall 140 and second side wall 144 of longitudinal trough 143. Each side wall has an upper portion 142 and a lower portion 141 and a top edge 139. Inner surface 138 of longitudinal trough 143 is also shown. Inner surface 138 is the surface which fiber optic cables rest against or lie on, in longitudinal trough 143.

Exit trough 100 with first side wall 103 and bottom end 107 is mounted to mount bracket 150. Mount bracket 150 is shown with bottom 151 which abuts, interacts with and/or supports the bottom wall of longitudinal trough 143. To install exit trough 100 on longitudinal trough 143, mount bracket 150 is first located as shown, and then attached or secured to either longitudinal trough 143 or to a separate or facilities support bracket 127 (as shown in FIG. 6).

Once mount bracket 150 is secured in place, exit trough 100 is mounted upon a top surface of mount bracket 150 and resilient member 152 may be utilized to secure exit trough 100 on mount bracket 150. Exit trough 100 includes fiber guard 112 to insure that fiber optic cables within longitudinal trough 143 do not slip up into and between exit trough 100 and longitudinal trough 143. With resilient member 152, it becomes relatively easy to disassemble the configuration and remove exit trough 100, simply by applying pressure to resilient member 152 toward the longitudinal trough 143, which releases the longitudinal trough for removal.

Figure 7:
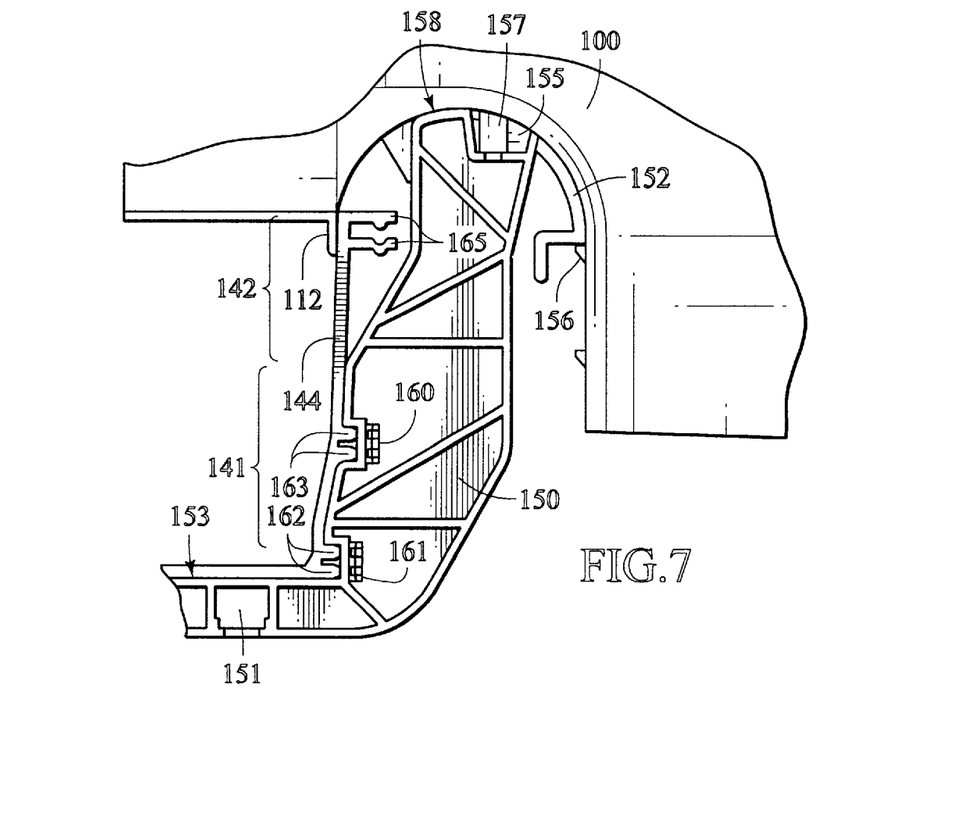
FIG. 7 is detail B—B from FIG. 6 illustrating the embodiment of the bracket support system from FIG. 6.

FIG. 7 shows a more detailed partial side view of the mount bracket 150 and one embodiment of its attachment to longitudinal trough 143 (identified in FIG. 6) and exit trough 100.

Figure 8:
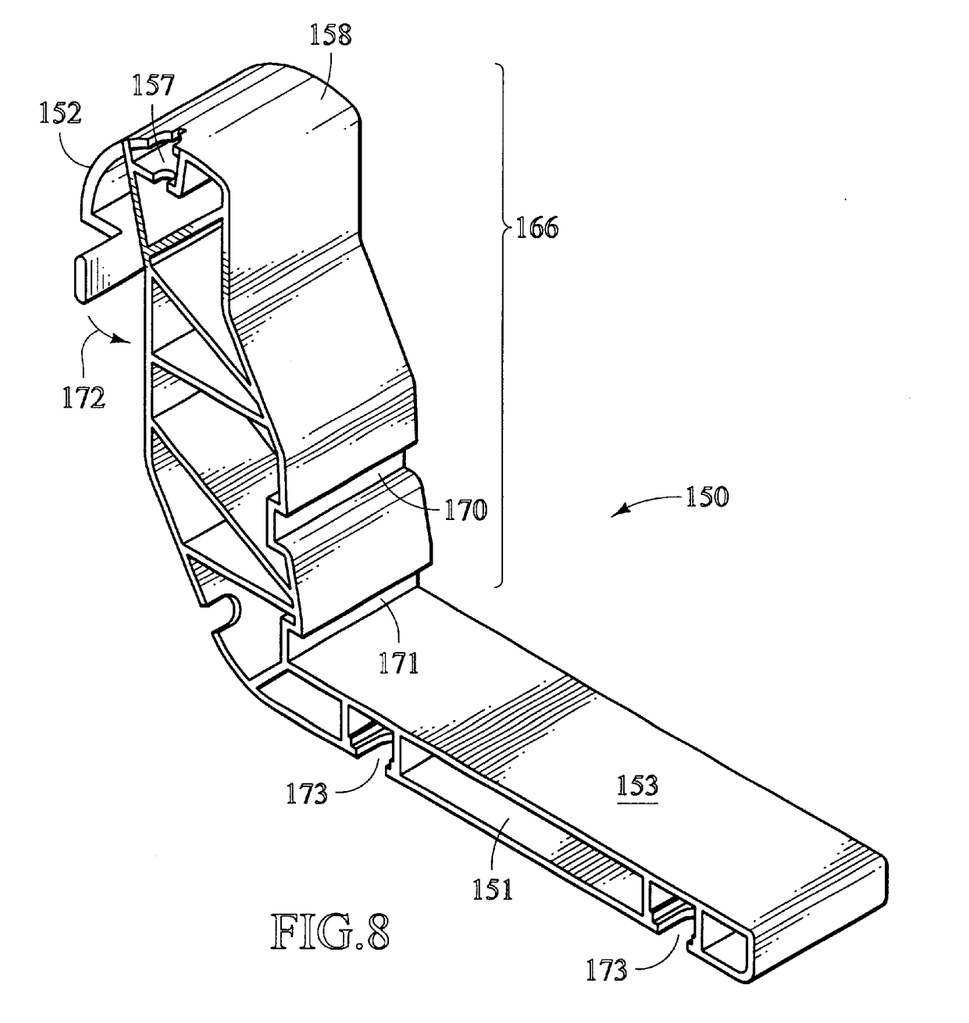
FIG. 8 is a perspective view of an embodiment of a bracket that may be used in an optical fiber cable exit trough system contemplated by this invention.

FIGS. 7 & 8 illustrate that the bottom 151 of mount bracket 150 has top surface 153 which may be located against the bottom of longitudinal trough 143. First fastener 160 and second fastener 161, which are preferably axially driven screws, are then inserted into respective side rails 163 and 162 of longitudinal trough 143. This provides one way of securing the mount bracket 150 to longitudinal trough 143. Other ways may be known in the art, such as providing a tab or other protrusion which would interact with and/or fit within rails 163 or 162 as mount bracket 150 is placed relative to longitudinal trough 143. There may be other variations depending on the configuration of the longitudinal trough, available rails and other available components to attach to.

It will be appreciated by those of ordinary skill in the art that in the embodiment shown, mount bracket 150 is mounted to the lower portion 141 of side wall 144. The top portion 142 is not utilized for any mounting or support or otherwise utilized, to avoid unnecessary or excessive bending or deformation of the top portion 142 of longitudinal trough 143. Longitudinal trough 143 has top rails 165 which, in the embodiment shown of this invention, is not utilized for mounting or support. Fiber guide 112 is placed and held relative to the inside of side wall 144 to prevent cables from becoming lodged between the exit trough and the side wall 144 of longitudinal trough 143. In order to avoid imposing a load on the upper portion of the side wall 144, the fiber guide 112 is not supported by or mounted to the top portion of side wall 144.

Exit trough 100 includes stop 156 which interacts with and/or abuts resilient member 152 to help secure and stabilize exit trough 100 relative to mount bracket 150. When resilient member 152 is moved toward side wall 144, it is moved away from stop 156 and allows exit trough 100 to be lifted up for removal when not loaded.

Exit trough support surface 158 of mount bracket 150 provides a surface on which a bottom surface of exit trough 100 may be placed and mounted. Exit trough 100 includes tab 157 which interacts with bracket tab 155 to provide a stop against clockwise rotation of exit trough 100.

FIG. 8 is a perspective view of one embodiment of a mount bracket 150 which may be utilized in combination with this invention. FIG. 8 shows top surface 153 of bottom 151, mount bracket arm 166, resilient member 152 with exit trough support surface 158. Tab/boss 157 interacts with exit trough 100 to prevent clockwise rotation in the configuration shown in FIG. 7, and to help locate the exit trough relative to the mount bracket 150. If desired, screws or another suitable fastener can be utilized to further secure the exit trough to the mount bracket. Corresponding apertures are provided in the mount bracket to accommodate such fasteners.

First groove 170 interacts with rails on a longitudinal trough, such as rails 163 on longitudinal trough 143 (See FIG. 6), and groove 171 in mount bracket 150 interacts with rails on the bottom side of the longitudinal trough, such as rails 162 on longitudinal trough 143 (See FIG. 7). Arrow 172 shows a direction of movement of resilient member 152. Mount bracket apertures 173 may be utilized to attach mount bracket 150 to a facility trough bracket or other support to position, mount and/or secure the mount bracket 150.

Figure 9:
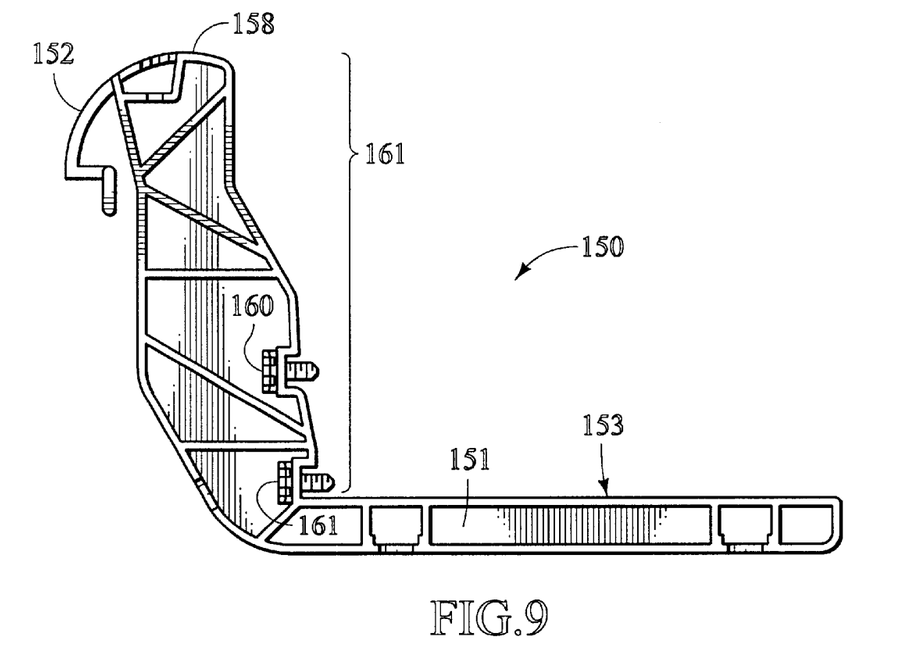
FIG. 9 is an elevation view of the bracket illustrated in FIG. 8.

FIG. 9 is an elevation view of the embodiment of the mount bracket 150 illustrated in FIG. 8, showing top surface exit trough support surface 158, resilient member 152, first fastener 160 and second fastener 161, and bottom 151 with top surface 153.

Figure 10:
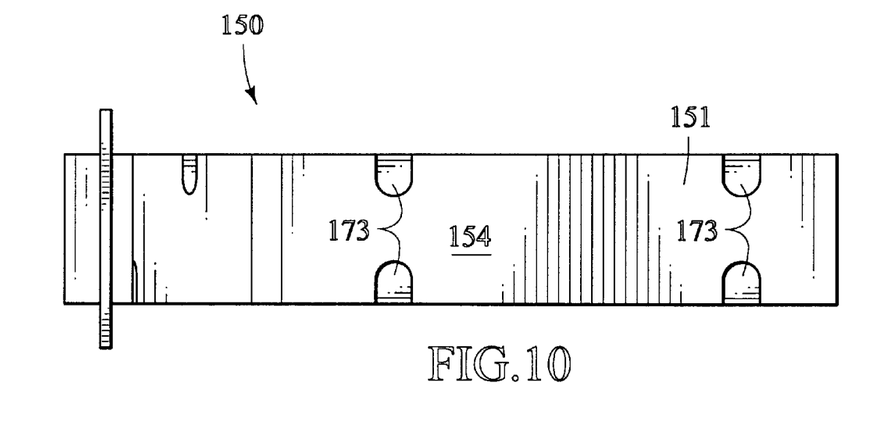
FIG. 10 is a bottom view of the bracket illustrated in FIG. 8.

FIG. 10 is a bottom view of the embodiment of the mount bracket 150 illustrated in FIG. 9, showing bottom 151, bottom surface 154 and mount bracket apertures 173.

As will be appreciated by those of reasonable skill in the art, there are numerous embodiments to this invention, and variations of elements and components which may be used, all within the scope of this invention.

One embodiment of this invention for example is a fiber optic cable exit trough system adapted for placement in a longitudinal trough, the exit trough system including a fiber optic cable exit trough system adapted for mounting relative to a longitudinal fiber optic cable trough which includes a trough bottom wall and at least one trough side wall, the exit trough system comprising: a mount bracket comprised of: a bracket bottom disposed to abut at least part of the trough bottom wall; a bracket arm attached to the bracket bottom, and which is configured to abut at least part of the trough side wall, the bracket arm further including an exit trough support surface; an exit trough supported by the mount bracket, the exit trough comprising: an entry trough section with a lead-in to the entry trough section, the lead-in providing bend radius protection for fiber optic cables routed therein; the exit trough defining a fiber optic cable pathway with a fiber support surface, a first sidewall and a second sidewall, the exit trough disposed to receive fiber optic cables routed from the longitudinal trough.

Embodiments of the system described above may further be a system wherein the mount bracket is mounted at the bottom section of the at least one trough side wall, or a system and/or wherein the bracket bottom is configured to be mounted to a support bracket which is separate from the longitudinal trough and/or wherein the bracket bottom is configured to be mounted to a facility support which is separate from the longitudinal trough.

The systems above may include embodiments wherein the bracket bottom and the bracket arm are one piece and/or wherein the bracket arm is configured to abut a bottom portion of the trough side wall, or even configured to be secured to a bottom portion of the trough side wall. It may be secured by numerous means, including to a bottom portion of the trough side wall by at least one fastener configured for securement to at least one rail on the trough side wall and/or wherein the at least one fastener is a threaded fastener which is rotated between rail components on the trough side wall to secure the bracket arm to the longitudinal trough.

Another embodiment of this invention may include a fiber optic cable exit trough system adapted for mounting relative to a longitudinal fiber optic cable trough which includes a trough bottom wall and at least one trough side wall, the exit trough system comprising: a mounting means comprised of: a bracket bottom disposed to abut at least part of the trough bottom wall; a bracket arm attached to the bracket bottom, and which is configured to abut at least part of the trough side wall, the bracket arm further including a means to support the exit trough; an exit trough supported by the mounting means, the exit trough comprising: an entry trough section with a lead-in to the entry trough section, the lead-in providing bend radius protection for fiber optic cables routed therein; and the exit trough defining a fiber optic cable pathway with a fiber support means, a first sidewall and a second sidewall, the exit trough disposed to receive fiber optic cables routed from the longitudinal trough.

This embodiment of the trough system may further be a configuration wherein the mounting means is mounted at the bottom section of the at least one trough side wall and or wherein the bracket bottom is configured to be mounted to a support means which is separate from the longitudinal trough. This embodiment may further be configured wherein the bracket arm is secured to a bottom portion of the trough side wall by at least one fastener means.

There are also embodiments of this invention as shown in the Figures, which are a fiber optic cable exit trough system adapted for mounting relative to a longitudinal fiber optic cable trough which includes a trough bottom wall and at least one trough side wall, the exit trough system including a variable cross section, and comprising: an entry trough section with an entry trough height and an entry trough width defining an entry cross sectional area, the entry trough height being less than the entry trough width; a down trough section creating a contiguous pathway with the entry trough section, the down trough section having a down trough width and a down trough depth defining an down trough cross sectional area; wherein the down trough depth is greater than the entry trough height.

Applications or embodiments of this exit trough system may be configured for example wherein the entry trough cross sectional area is approximately equal to the down trough cross sectional area and/or wherein the entry trough height is less than one-half of the entry trough width, and the down trough depth is approximately equal to the down trough width.

This invention also includes method or process embodiments, such as a method of assembling a fiber optic cable routing system comprising the following steps: providing a longitudinal trough section; mounting a fiber optic cable exit trough to a bottom section of the longitudinal trough section; and routing a cable from the longitudinal trough section upwardly and transversely, through the exit trough.

Another method embodiment of this invention is a method of assembling a fiber optic cable routing system comprising the following steps: providing a longitudinal trough section with a bottom wall and at least one side wall with a top portion and a bottom portion; mounting an exit trough mount bracket relative to the bottom wall of the longitudinal trough section; mounting an exit trough to the mount bracket above the at least one side wall; and routing a cable from the longitudinal trough section upwardly and transversely, through the exit trough.

This method embodiment may be further configured such that the mount bracket is mounted to the bottom portion of the at least one side wall and/or wherein the mount bracket is secured to a separate facilities support bracket.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A fiber optic cable exit trough system adapted for mounting relative to a longitudinal fiber optic cable trough which includes a trough bottom wall and at least one trough side wall, the exit trough system comprising:
    a mount bracket comprised of:
        a bracket bottom disposed to abut at least part of the trough bottom wall;
        a bracket arm attached to the bracket bottom, and which is configured to abut at least part of the trough side wall, the bracket arm further including an exit trough support surface;
    an exit trough supported by the mount bracket, the exit trough comprising: an entry trough section with a lead-in to the entry trough section, the lead-in providing bend radius protection for fiber optic cables routed therein; the exit trough defining a fiber optic cable pathway with a fiber support surface, a first sidewall and a second sidewall, the exit trough disposed to receive fiber optic cables routed from the longitudinal trough.

2. A fiber optic cable exit trough system as recited in claim 1, and wherein the mount bracket is mounted at the bottom section of the at least one trough side wall.

3. A fiber optic cable exit trough system as recited in claim 1, and wherein the bracket bottom is configured to be mounted to a support bracket which is separate from the longitudinal trough.

4. A fiber optic cable exit trough system as recited in claim 1, and wherein the bracket bottom is configured to be mounted to a facility support which is separate from the longitudinal trough.

5. A fiber optic cable exit trough system as recited in claim 1, and wherein the bracket bottom and the bracket arm are one piece.

6. A fiber optic cable exit trough system as recited in claim 1, and wherein the bracket bottom is configured to abut the bottom of the longitudinal trough.

7. A fiber optic cable exit trough system as recited in claim 1, and wherein the bracket bottom is configured to be secured to the bottom of the longitudinal trough.

8. A fiber optic cable exit trough system as recited in claim 1, and wherein the bracket arm is configured to abut a bottom portion of the trough side wall.

9. A fiber optic cable exit trough system as recited in claim 1, and wherein the bracket arm is configured to be secured to a bottom portion of the trough side wall.

10. A fiber optic cable exit trough system as recited in claim 1, and wherein the bracket arm is secured to a bottom portion of the trough side wall by at least one fastener configured for securement to at least one rail on the trough side wall.

11. A fiber optic cable exit trough system as recited in claim 9, and wherein the at least one fastener is a threaded fastener which is rotated between rail components on the trough side wall to secure the bracket arm to the longitudinal trough.

12. A fiber optic cable exit trough system adapted for mounting relative to a longitudinal fiber optic cable trough which includes a trough bottom wall and at least one trough side wall, the exit trough system comprising:
   a mounting means comprised of:
      a bracket bottom disposed to abut at least part of the trough bottom wall;
      a bracket arm attached to the bracket bottom, and which is configured to abut at least part of the trough side wall, the bracket arm further including a means to support the exit trough;
   an exit trough supported by the mounting means, the exit trough comprising: an entry trough section with a lead-in to the entry trough section, the lead-in providing bend radius protection for fiber optic cables routed therein; and the exit trough defining a fiber optic cable pathway with a fiber support means, a first sidewall and a second sidewall, the exit trough disposed to receive fiber optic cables routed from the longitudinal trough.

13. A fiber optic cable exit trough system as recited in claim 12, and wherein the mounting means is mounted at the bottom section of the at least one trough side wall.

14. A fiber optic cable exit trough system as recited in claim 12, and wherein the bracket bottom is configured to be mounted to a support means which is separate from the longitudinal trough.

15. A fiber optic cable exit trough system as recited in claim 12, and wherein the bracket bottom is configured to be mounted to a facility support means which is separate from the longitudinal trough.

16. A fiber optic cable exit trough system as recited in claim 12, and wherein the bracket bottom and the bracket arm are one piece.

17. A fiber optic cable exit trough system as recited in claim 12, and wherein the bracket bottom is configured to abut the bottom of the longitudinal trough.

18. A fiber optic cable exit trough system as recited in claim 12, and wherein the bracket bottom is configured to be secured to the bottom of the longitudinal trough.

19. A fiber optic cable exit trough system as recited in claim 12, and wherein the bracket arm is configured to abut a bottom portion of the trough side wall.

20. A fiber optic cable exit trough system as recited in claim 12, and wherein the bracket arm is configured to be secured to a bottom portion of the trough side wall.

21. A fiber optic cable exit trough system as recited in claim 12, and wherein the bracket arm is secured to a bottom portion of the trough side wall by at least one fastener means.

22. A fiber optic cable exit trough system adapted for mounting relative to a longitudinal fiber optic cable trough which includes a trough bottom wall and at least one trough side wall, the exit trough system including a variable cross section, and comprising:
   an entry trough section with an entry trough height and an entry trough width defining an entry cross sectional area, the entry trough height being less than the entry trough width;
   a down trough section creating a contiguous pathway with the entry trough section, the down trough section having a down trough width and a down trough depth defining an down trough cross sectional area;
wherein the down trough depth is greater than the entry trough height.

23. A fiber optic cable exit trough system as recited in claim 22, and further wherein the entry trough cross sectional area is approximately equal to the down trough cross sectional area.

24. A fiber optic cable exit trough system as recited in claim 22, and further wherein the entry trough height is less than one-half of the entry trough width, and the down trough depth is approximately equal to the down trough width.

25. A method of assembling a fiber optic cable routing system comprising the following steps:

providing a longitudinal trough section;

mounting a fiber optic cable exit trough to a bottom section of the longitudinal trough section; and routing a cable from the longitudinal trough section upwardly and transversely, through the exit trough.

26. A method of assembling a fiber optic cable routing system comprising the following steps:

providing a longitudinal trough section with a bottom wall and at least one side wall with a top portion and a bottom portion;

mounting an exit trough mount bracket relative to the bottom wall of the longitudinal trough section;

mounting an exit trough to the mount bracket above the at least one side wall; and routing a cable from the longitudinal trough section upwardly and transversely, through the exit trough.

27. A method of assembling a fiber optic cable routing system as recited in claim 26, and further wherein the mount bracket is mounted to the bottom portion of the at least one side wall.

28. A method of assembling a fiber optic cable routing system as recited in claim 26, and further wherein the mount bracket is secured to a separate facilities support bracket.

* * * * *

UNITED STATES PATENT AND TRADEMARK OFFICE
CERTIFICATE OF CORRECTION

PATENT NO. : 6,633,718 B1
DATED : October 14, 2003
INVENTOR(S) : Terry T. Thom

It is certified that error appears in the above-identified patent and that said Letters Patent is hereby corrected as shown below:

Column 10,
Line 30, replace "mounting a fiber optic cable exit trough to a bottom" with
-- mounting a fiber optic cable exit trough to a bottom surface of a bottom --

Signed and Sealed this

Twenty-seventh Day of April, 2004

JON W. DUDAS
*Acting Director of the United States Patent and Trademark Office*